United States Patent [19]
Asterö

[11] 3,900,253
[45] Aug. 19, 1975

[54] OPTICAL PROJECTING APPARATUS
[75] Inventor: Jan-Erik Asterö, Tumba, Sweden
[73] Assignee: Lindaco Ltd., Geneva, Switzerland
[22] Filed: Apr. 20, 1973
[21] Appl. No.: 353,202

[30]     Foreign Application Priority Data
  Apr. 26, 1972   Sweden.......................... 5521/72
  July 3, 1972    Sweden.......................... 8743/72
  Sept. 12, 1972  Sweden......................... 11778/72

[52] U.S. Cl. ..................... 353/63; 353/66; 353/68; 353/87; 353/98; 353/122
[51] Int. Cl...G03b 21/08; G03b 21/20; G03b 21/00
[58] Field of Search............ 353/63, 64, 65, 66, 68, 353/87, 98, 99, 122; 178/7.92, 7.91

[56]            References Cited
           UNITED STATES PATENTS
1,831,766   11/1931   Hanks................................. 353/63
2,482,031    9/1949   Rose................................... 353/75
3,124,035    3/1964   Lucas.................................. 353/82
3,401,592    9/1968   Altman................................ 353/99

Primary Examiner—Richard E. Aegerter
Assistant Examiner—Steve L. Stephan
Attorney, Agent, or Firm—Toren, McGeady and Stanger

[57]            ABSTRACT

There is provided an optical projecting apparatus comprising a combined overhead-episcopic projector, a diascopic projector and/or a film projector, wherein one light source is arranged to be placed in different positions corresponding to transmission of light to the different projection systems. The light may be guided from the light source to the different systems by means of glass fibre optics. A TV-set may be mounted at the table of the apparatus so that a TV-image may be projected by means of the combined projector.

11 Claims, 4 Drawing Figures

OPTICAL PROJECTING APPARATUS

The present invention relates to an optical projecting apparatus comprising a diascopic projector, a combined overhead and episcopic projector, in which the light is deflected by a mirror, and a light means.

In audiovisual education and information there are problems depending on that the material to be projected often is of different type, for example printed matter, diaslides, cinematografic film, transparencies, and stripes of dias. During one lesson it is therefore often necessary to use one projecting system for every image bearing type of material system. This is a severe problem not the least in schools, where space shortage in different rooms, transportational difficulties and, not the least, economical reasons are restricting the projection of all material.

Another problem is that so-called ghost images result from overhead projectors of the type having reflecting table, especially when stacked transparencies are shown.

One object of the invention is therefore the provision of simply manageable projection apparatus being capable of projecting all said image bearing materials.

Another object is to provide suitable light means for the different projecting systems of the projecting apparatus.

According to the invention said objects are fulfilled and said problems are solved in that the light source, which comprises at least one light source and at least one reflector, is arranged to be positioned in different positions corresponding to illumination of the combined overhead episcopic projector and the diascopic projector respectively. The projection apparatus may also comprise a cinematografic film projector, in which case the light means is arranged to be positioned for directing light to said film projector. A second light means, which comprises at least one light source and at least one reflector, may be arranged preferably in the vicinity of the mirror of the combined overhead-episcopic projector, to increase the luminance of episcopic images, when necessary, and to eliminate ghost pictures when stacked overhead transparencies are shown.

Another purpose of the present invention is to provide a projecting apparatus, in which one has full freedom in the positioning of the light means relatively to the different projecting systems, and in which only light of substantially visible frequencies, so-called cold light reaches the image bearing material.

According to the invention there is therefore also provided a projection apparatus comprising light guides, for example glass fibre optics, which are arranged to guide the light from the light means to the image material and the lens system of the different projecting systems.

Due to the flexibility of the light guide one has full freedom on the positioning of the light means relatively to the image bearing material.

The light guide may for example comprise the glass fibre optic, that is sold under the trade mark FIBROX by The Rank Organisation, Leicester, Great Britain. Preferably one should choose such dimensions for the optic that substantially correspond to size and form of the image material so that the power density may be reduced. A light guide of this type is substantially only letting light of visible frequencies through, and therefore a harmful heat radiation is avoided at the exit of the guide.

As cold light is delivered to the image material, it is not necessary to provide any special cooling thereof. The risk for melting or inflammation of the image material and for burns resulting from touches on the inside parts of the apparatus is therefore eliminated. This has special importance when the apparatus is used in schools, as pupils nowadays should be taught to use projecting systems when accounting for special works etc.

In the apparatus according to the invention, it is only necessary to cool the light source. This cooling may be accomplished by means of a fan, which may be built-in into a separate housing together with the light source. If the housing then is sound-isolated the noise from the fan can simply and effectively be reduced, and further the heat from the light source can be prevented from entering the other parts of the apparatus.

According to Another embodiment the apparatus comprises a TV-set, the image surface of which is arranged horizontally in flush with the table and projecting upwards, a mirror arranged above the image surface for deflecting the image, and an optical system for projection of the rightly turned image onto a substantially vertical screen. In this embodiment the apparatus may also be used, for example, for projection of image materials for episcopic and/or overhead projectors, and may further be combined with a diascopic projector and a film projector.

It should, however, be appreciated that a combined episcopic film projector may be used instead of separate episcopic and film projectors.

The invention will now be described more in detail with reference to the accompanying drawing, on which FIG. 1 illustrates an elevated cross section of an apparatus according to the invention.

Figure 1:
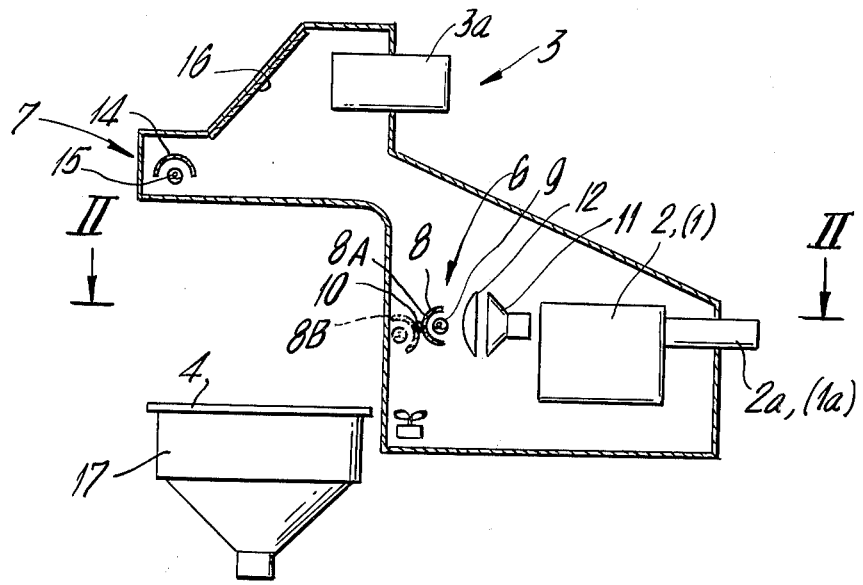
Figure 2:
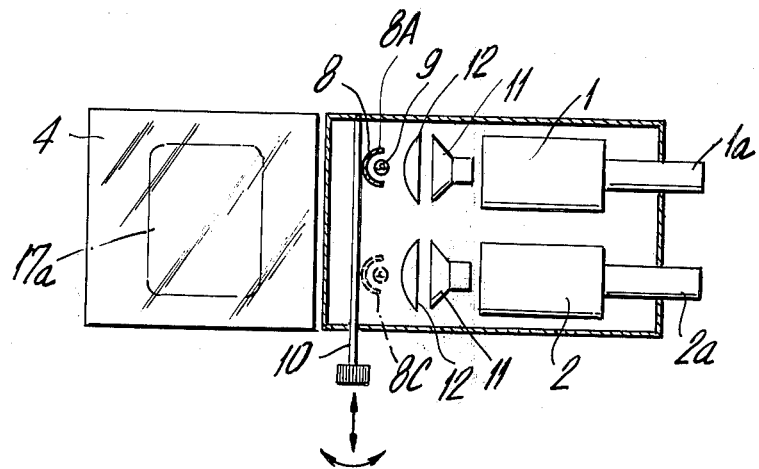
FIG. 2 illustrates a section taken along line II—II in FIG. 1.

The optical projecting apparatus according to FIGS. 1 and 2 is a combined apparatus, in which a TV-set 17 is combined with other projecting systems. The apparatus comprises, further to the TV-set 17, a film projector 1 having a lens system 1a, a diascopic projector 2 having a lens system 2a, and a combined episcopic-overhead projector 3 having a lens system 3a. Further, the apparatus comprises a vertically movable table 4, for example in the form of a glass plate. The table 4 works partly as a base for the pictures to be shown by means of the episcope 3, partly as a support or foot for the TV-set, as the TV-set may be fastened to the bottom side of the table by means of not shown fasteners, so that the image surface 17a is placed horizontally under the glass plate of the table. The fasteners are preferably designed so that a TV-set of suitable size, for example 2 inch, 5 inch, 9 inch, 12 inch or 14 inch TV-set, may be mounted under the table 4. The table 4 may be raised or lowered by means of a not shown device and may also be used for adjustment of focus.

The table 4 is preferably of a size that permits projection of a picture, being placed in the apparatus and being of at least A4-size, via the lens system 3a.

Further, the apparatus comprises a first and a second light means 6, 7 respectively. The first light means 6, which comprises a reflector 8 and a lamp 9, is mounted on a shaft 10. The shaft 10 is arranged in the plane through the lens systems of the diascopic projector 2 and the film projector 1 and is axially shiftable to two end positions and is further rotatable to two angular positions. The shaft 10 is locked in its angular and axial positions 8A, 8B and 8C corresponding to the alignment of the first light means 6 to the different projection systems, by means of locking means (not shown). Thus, the episcope 3 is prepared for projection when the shaft 10 is turned so that the light means 6 is directed towards the table 4, independent of the axial position of the shaft 10.

The second light means 7, which comprises a reflector 14 and a lamp 15, is mounted in the vicinity of the mirror 16 of the episcope 3 and is directed towards the table 4. The light means 7, the luminance of which may be varied, is turned on by the rotation of shaft 10 for illumination of the table 4 by means of the light means 6. The second light means are included in order to increase the luminance of episcopic images and in order to eliminate ghost pictures when stacked overhead transparencies are shown.

Thus, the shaft 10 is used as a selector of operation and due to the coupling and mounting of the light means, light can only be sent through that projector system 1, 2 or 3 that has been chosen by means of the shaft 10.

Funnels 11, the inside of which is highly reflecting, and condenser lenses 12 are arranged between the light means 6 in its axial end positions 8A, 8C and the film projector 1 and the diascopic projector 2 respectively, to accomplish maximum light transmission to said projection systems.

The film projector 1 is for example of super-8 type and may be adapted for film cassets. The diascopic projector may also be provided with means for projection of diascopic films.

When the apparatus is to be used for projection of TV-images, the light means 6 and 7 are turned off, so that the TV-image is projected via the mirror 16 and the lens system 3a onto a screen. The TV-set is preferably adapted for tape-cassets.

The surface of the table 4 may also be coated with a reflecting material for example glass powder. The top surface of the table may for example be a mirror which is coated with a transparent binder, such as cellulose lacquer which on its part is coated with and binds a glass powder. The glass powder is spread in an amount of about 90–100 grs. per 8.5 dm$^2$ and has a corn diameter of about 0.40 mm. The table should then be removable or pivoted so that it may be pivoted away from the light beam from the TV-set, when a TV-image is projected.

Figure 3:
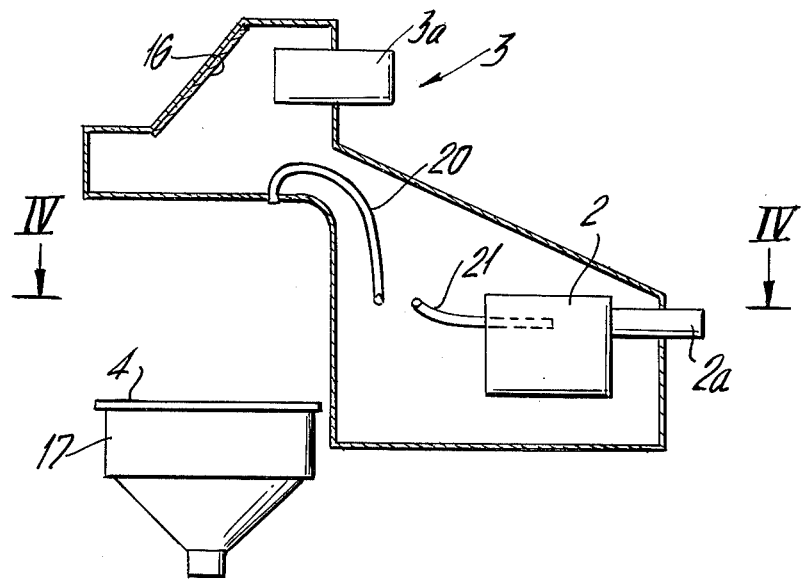
FIG. 3 illustrates an alternative embodiment of the apparatus.
Figure 4:
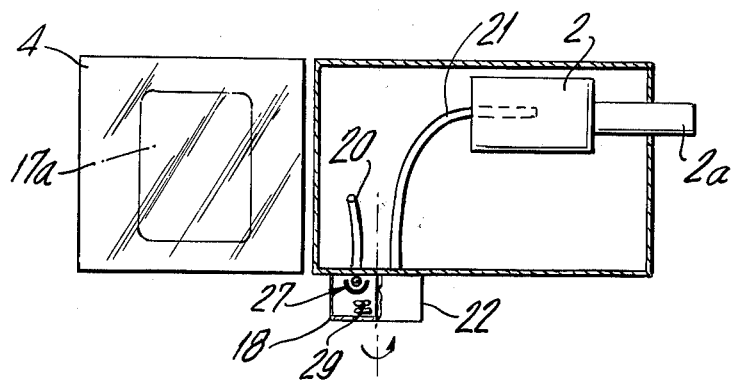
FIG. 4 illustrates a section taken along line IV—IV in FIG. 3.

FIGS. 3 and 4 show an optical projecting apparatus comprising an overhead projector 3, the mirror 16, lens system 3a and table 4 of which are indicated on the left part of FIG. 3, and a diascopic projector 2, having a lens system 2a. Light is directed via for example fibre optics 20, 21 towards the table 4 and the image material of the diascopic projector 2 respectively. The ends of the fibre optics 20, 21 are gathered at one side of the apparatus. A revolver 22 is rotatably mounted at said side of the apparatus and includes an eccentrically arranged housing 18, which contains a light means 27 and a cooling fan 29. The light means may be aligned with any desired fibre optic by a turning of the revolver 22 so that the housing 18 is moved along a circular path until the light means 27, which is placed within the housing, is aligned with the desired fibre optic end. The ends of the fibre optics are gathered along a corresponding circular path.

It should be appreciated that also further projection systems being provided with light guides, may be similarly arranged in the projection apparatus according to the invention.

What is claimed is:

1. Projection apparatus of the overhead type, comprising: a TV-set, the picture tube surface of which is arranged horizontally; a mirror positioned above said picture tube surface for deflecting light from said picture tube surface, and a lens system for projecting the image of the picture tube surface, support means for mounting said TV-set, said support means at its top side being provided with a sheet of transparent material, light means for illuminating said sheet from a position above said surface, whereby said projection apparatus is a combined overhead and episcopic projector which functions to project an image from said picture tube by directing light orginating from said picture tube to said mirror and reflecting it thereby through said lens system; to project an image from a full size transparency placed on said transparent material by directing light originating from said picture tube through said transparency and to said mirror where it is reflected through said lens system; and to project an image from an opaque picture placed on said sheet of transparent material by directing light originating from said light means to said opaque picture and thence to said mirror where it is reflected through said lens system.

2. The projection apparatus according to claim 1 wherein the transparent material is a glass sheet.

3. Projecting apparatus in accordance with claim 1 further comprising a diascopic projector having a second lens system and wherein said light means includes at least one light source and at least one reflector, said light source and reflector being selectively movable for either providing light to said combined overhead and episcopic projector or to said diascopic projector.

4. Apparatus according to claim 3 further comprising a strip film projector having a third lens system, said light means being arranged for transmission of light to the said film projector.

5. Apparatus according to claim 3 wherein said light means is a first light means and further comprising a second light means containing at least one light source and at least one reflector, said second light means being arranged above said transparent sheet adjacent to the mirror in order to increase the luminance of episcopic images and in order to assist in reducing ghost pictures when stacked overhead transparencies are shown.

6. Apparatus according to claim 5, characterised in that the second light means has variable luminance.

7. Apparatus according to claim 5, including means for turning on said second light means when the first light means is directed towards the transparent sheet and for turning off said second light means when the first light means is directed towards the film projector or the diascopic projector.

8. Apparatus according to claim 3, including a rotatable and axially shiftable shaft, the first light means being mounted on said shaft, said shaft being arranged to position said first light means for transmission of light to the various projectors and the apparatus includes means for locking the shaft.

9. Apparatus according to claim 3, comprising also a table, characterised in that the top surface of the table is composed of a mirror, which is coated with a transparent binder, for example cellulose lacquer, which on its part is coated with and binds a glass powder.

10. Apparatus according to claim 9, characterised in that the glass powder is spread in an amount of about 90 – 100 grs per 8.5 dm$^2$ and has a corn diameter of about 0.40 mm.

11. Apparatus according to claim 3 wherein said projectors each are provided with a light guide, each of said light guides having a first and second outer end, said first outer end being coupled to one of said projectors, said light means being mounted in a housing, said apparatus including means to revolve said housing in a path of revolution for cooperating with the second outer end of said light guide of any of the projectors, said second outer ends of the light guides of the projectors being gathered along a circular path, corresponding to the path of revolution of the housing.

* * * * *